United States Patent [19]

Nicholson et al.

[11] 4,122,148

[45] Oct. 24, 1978

[54] SULFUR DIOXIDE REMOVAL PROCESS

[75] Inventors: Norman E. Nicholson, Stockton-on-Tees; John Scarlett, Spennymoor, both of England

[73] Assignee: Davy Powergas Inc., Lakeland, Fla.

[21] Appl. No.: 678,606

[22] Filed: Apr. 20, 1976

[51] Int. Cl.$^2$ .................. C01B 17/00; C01D 7/00; C01B 15/08; C01B 17/64
[52] U.S. Cl. .................. 423/242; 423/428; 423/422; 423/514
[58] Field of Search ............... 423/242, 551, 514, 428, 423/422

[56] References Cited

U.S. PATENT DOCUMENTS

| | | | |
|---|---|---|---|
| 3,653,812 | 4/1972 | Schneider et al. | 423/242 |
| 3,790,660 | 2/1974 | Earl et al. | 423/242 |
| 3,808,325 | 4/1974 | Urban | 423/242 |
| 3,838,191 | 9/1974 | Urban | 423/514 X |
| 3,971,844 | 7/1976 | Schneider | 423/242 X |

OTHER PUBLICATIONS

Industrial & Engineering Chemistry, vol. 53, No. 8, p. 620, Saeman.

*Primary Examiner*—O. R. Vertiz
*Assistant Examiner*—Gregory A. Heller
*Attorney, Agent, or Firm*—Bernard & Brown

[57] ABSTRACT

Sodium thiosulfate is purged from a sulfur dioxide removal system involving contact of a sulfur dioxide-containing gas with a solution containing sodium sulfite to absorb sulfur dioxide from the gas. A portion of the liquid from a desorption zone containing a minor amount of sodium thiosulfate and a relatively large amount of sodium bisulfite, is treated to reduce the amount of water in the medium so that solids are precipitated from the liquid phase. The insolubles containing sodium sulfites are removed from the liquid. The liquid separated from the solids can be discarded and thereby purge thiosulfate more selectively with respect to other sodium salts. Also, the sodium values of the sodium thiosulfate-containing purge liquid can be recovered in active form by chemical reduction, and, preferably, carbonation. A sodium sulfate purge material from the absorption-desorption system can also be subjected to the chemical reduction system for further recovery of active sodium values.

29 Claims, 1 Drawing Figure

SULFUR DIOXIDE REMOVAL PROCESS

This invention relates to the removal of sulfur dioxide from gas streams by contact with an aqueous sodium sulfite solution to absorb sulfur dioxide and provide a solution richer in sodium bisulfite which can be treated to desorb sulfur dioxide and regenerate the absorbing solution for reuse. Sodium thiosulfate is formed in the system as an undesirable by-product in the absorption-desorption medium, and by the process of this invention the thiosulfate can be purged from the system in a selective manner with comparatively little, if any significant, loss of valuable sodium compounds. More particularly, the invention concerns a process for reducing the loss of active sodium values from the cyclic sulfur dioxide removal system by separating undesirable sodium thiosulfate from the absorption-desorption medium as a solution containing an increased amount of sodium thiosulfate. If desired, the sodium values in the liquid purge stream containing sodium thiosulfate can be recovered in active form in, e.g., a chemical reduction system, and other material from the absorption-desorption operation and containing sodium sulfate may be added to the chemical reduction system for further recovery of active sodium values.

In the reduction system sulfite and bisulfite react more readily with the reductants, and the increase in the concentration of thiosulfate or sulfate in the material fed to the reduction stage in accordance with this invention improves the economy and efficiency of this operation. If the reduction were employed without the thiosulfate concentration step of this invention, any bisulfide produced during the reduction and returned to the absorption-desorption system leads to the formation of more thiosulfate and the additional sulfite and bisulfite which would be associated with the thiosulfate when fed to the reduction system for purging would be reduced thereby lowering the reduction efficiency still further.

Sulfur dioxide is a recognized pollutant of the atmosphere and is produced by oxidation of sulfur or sulfur-bearing materials. Sulfur dioxide is found in significant amounts as a constituent of various waste gases such as smelter gases, off-gases from chemical plants, and stack or furnace gases from coal or oil-burning furnaces such as are used in electric power plants. Although the concentration of sulfur dioxide in such gases is generally minor, e.g., from about 0.001 up to about 5 mole percent, and is frequently less than about 0.5 mole percent (less than about 1% by weight), the emission of sulfur-dioxide may be substantial, particularly in industrial applications due to the large amount of sulfurbearing material being processed. For instance, a modern electric plant having a 1,350,000 kw. capacity will burn up to about 15,000 tons of coal per day. Despite the fact that the concentration of sulfur dioxide in the stack gases from the electric plant can be low, e.g., of the order of 0.2 to 0.3 mole percent, the total sulfur dioxide produced may be in the neighborhood of 1,000 tons per day. Similarly, significant amounts of sulfur dioxide are produced in utilization of other fuels which may bear sulfur.

The removal of sulfur dioxide from sulfur dioxide containing gases may be effected by treatment with an aqueous sodium sulfite solution. The operation of an efficient and economical system for removal of sulfur dioxide will be characterized not only by the efficiency of absorption of sulfur dioxide form the sulfur dioxide-containing gases, the efficiency of desorption of sulfur dioxide from the spent absorbing solution, and the purity of the sulfur dioxide product, but also by the minimization of loss of metal values. Sulfur dioxide-containing gas obtained, for instance, by burning sulfur-bearing mineral products and the like as fuels, can be contacted with sodium sulfite in an aqueous solution to form bisulfite, and thereby substantially reduce the sulfur dioxide content of the gas to, for instance, less than about 0.02 mole percent when the sulfur dioxide-containing feed gas comprises more than about 0.2 mole percent sulfur dioxide. The removal of sulfur dioxide from the gases is often up to about 95 percent or more. The spent absorbing solution can be heated to convert the bisulfite to sulfite and sulfur dioxide, and to generate a liquid or liquid-solid material which serves as the source of the absorbing solution. The sulfur dioxide can be drawn-off and cooled or compressed to provide a liquid product or sent as a gas to a sulfuric acid plant or sulfur plant. Regenerated absorbing solution can be recycled to the absorption zone. For additional information and further exemplification regarding sulfur dioxide removal systems which can advantageously employ the technology disclosed herein, see U.S. Pat. Nos. 3,607,037, 3,653,812, and 3,790,660, all of which are incorporated herein by reference.

The sulfur dioxide-containing gases to be treated usually contain materials such as sulfur trioxide, oxygen, elemental iron, and the like, and, particularly when the gases containing sulfur dioxide are derived from the combustion of fuel, other materials which may be present include oxides of nitrogen. At least some of these materials promote the oxidation of the sodium sulfite or bisulfite to sulfate. Sodium thiosulfate and sodium sulfate are also formed to a minor extent in the process by the disproportionation reaction of sodium bisulfite, and as they cannot be regenerated to sulfite in the desorption stage, build-up of thiosulfate and sulfate occurs in the system. A portion of the absorbing-desorbing medium can be purged from the system to prevent unduly large amounts of inert thiosulfate and sulfate from accumulating in the system. For thiosulfate purge a portion of the liquid phase in the desorption zone may be discarded since it has a greater thiosulfate concentration than exists in other parts of the system, but this concentration is minor and usually still less than about 5 weight percent on a non-aqueous basis. The sulfate purge may be a portion of the spent absorption solution or material obtained in the desorption of the sulfur dioxide from the spent absorbing solution. These thiosulfate and sulfate-containing purge materials, however, have substantial amounts of active sulfite or bisulfite, along with the inactive thiosulfate or sulfate, and when the purge is discarded, an undue expense may occur due to the accompanying loss of usable sodium values from the system which must be replaced by the addition of a suitable soluble sodium compound.

By the present invention, there has been devised a highly advantageous procedure for reducing the amount of sodium thiosulfate in sodium sulfite-bisulfite, absorption-desorption systems for removing sulfur dioxide from gaseous streams. Accordingly, a portion of the aqueous sodium thiosulfatecontaining liquid medium in the desorption zone containing a relatively large quantity of sodium bisulfite along with sodium sulfite, is withdrawn from the absorption-desorption cycle and treated to remove water and thereby precipitate solids from the liquid phase. This treatment is continued for a sufficient length of time to ensure sufficient precipitation of solids to provide a substantial increase in the sodium thiosulfate concentration in the liquid phase on a total salt basis. The amount of solids precipitated may on a dry basis be at least about 15 weight percent of the liquid phase treated, and may often be up to about 40 or more weight percent. The removal of water may preferably be continued until about 20 to 30 weight percent of undissolved solids are formed based on the weight of the liquid treated.

The precipitated solids which contain sodium sulfite, and often one or both of sodium bisulfite and sodium sulfate, can be readily removed from the resulting slurry by the use of conventional liquid-solid separation equipment to provide a liquid containing an increased concentration of dissolved sodium thiosulfate, than was dissolved in the liquid prior to the removal of water. The separated solids may contain a major amount of sodium sulfite, and a minor amount, if any, of one or both of sodium bisulfite and sodium sulfate. Generally, these amounts may be 0 to about 20 weight percent sodium bisulfite, and less than about 50 weight percent sodium sulfate based on the total weight of the solids. The concentration of sodium thiosulfate based on the total salts dissolved in the liquid phase after the removal of water is often at least about 2 times, preferably about 3 to 4 times, the concentration of sodium thiosulfate based on the total salts dissolved in the desorption zone liquid from which the solids are formed by the evaporation of water. After the precipitation of solids by the removal of water has occurred, the concentration of dissolved sodium thiosulfate may often be at least about 5 weight percent, say up to about 20 weight percent, preferably about 9 to 11 weight percent, on the basis of total dissolved salts. This liquid phase can be discarded or can be treated, e.g., by chemical reduction with or without carbonation or other treatments, to recover sodium values therefrom in a form which is reusable in the absorption-desorption procedure.

In the method of the present invention, the aqueous desorption zone solution which undergoes water removal and precipitation of solids as a means of purging sodium thiosulfate, contains a major weight amount of sodium bisulfate and minor amounts of sodium thiosulfate, sodium sulfite and sodium sulfate, based on the total of these components. The sodium thiosulfate content of this stream will generally not exceed about 10 weight percent, and is usually at least about 1 weight percent, and may often be about 2 to 5 weight percent on a dry basis.

In the present invention sodium thiosulfate is removed from the system by treating a portion of the aqueous desorption zone liquid to evaporate a sufficient amount of water to precipitate a significant amount of solids in the solution as aforesaid. The desorption zone is preferably operated in a manner which provides a mixed liquid-solid material in the desorption zone and such a slurry may be treated to remove water from its liquid phase for the purpose of concentrating thiosulfate, or preferably the liquid may be separated from the solids in the slurry before such treatment. The water content of the separated liquid which is subjected to the evaporative treatment may often thereby be reduced by at least about 25 weight percent, preferably by at least about 50 weight percent, based on the amount of water in the material fed to the evaporative treatment, and the material generally remains sufficiently fluid to be readily pumpable. The operation is advantageously conducted at somewhat elevated temperatures. Suitable temperatures for accomplishing the desired evaporation of water include about 40° to 120° C., preferably about 40° to 90° C. The choice of temperature may depend on the pressure employed, and the pressure may be ambient, reduced or elevated. Advantageously, the pressure is about 10 to 20 psia, and preferably, essentially atmospheric pressure is used.

The slurry obtained from the water evaporation operation is subjected to liquid-solid separation to provide a separate solid phase which is relatively high in sodium sulfite content and can be returned to the absorption-desorption system, e.g., to the absorption zone after dissolution in an aqueous liquid. The separation temperature may often be about 40° to 120° C., preferably about 40° to 90° C., and the separation may be done at substantially the same temperature employed for the evaporation of water.

The amount of liquid solution treated in this water evaporation stage of the process is sufficient to alleviate undue build-up of sodium thiosulfate in the absorption-desorption system. The amount of thiosulfate purged is preferably substantially equal to the amount of thiosulfate being formed in the absorption-desorption system after taking into account any other thiosulfate that may be removed by other means, e.g., as a result of sodium sulfate purge or removal. As the amount of desorption zone liquid treated for thiosulfate removal is increased the percentage of solids formed during the evaporation of water may be decreased and still get adequate thiosulfate purging. Frequently at least about 1 weight percent of the total desorption zone liquid phase is treated for water evaporation, and say up to about 5 or more weight percent, advantageously about 2 to 3 weight percent. Preferably, this amount is sufficient so that a maximum of about 30 weight percent solids based on the liquid phase treated need be precipitated to have an adequate purge of sodium thiosulfate. The concentration of sodium thiosulfate in the liquid obtained from the water evaporation stage may be increased by recycling to this stage a portion of the liquid obtained from the water evaporation operation compared with a system in which the recycling is not undertaken.

In the above procedure for purging sodium thiosulfate and in processes for purging sodium sulfate from the sulfur dioxide absorption-desorption system considerable expense is encountered since sodium values are discarded in the form of sodium thiosulfate and sulfate which are inert in the sulfur dioxide absorption-desorption cycle. The discards usually also include one or both of active sodium bisulfite and sulfite. In one aspect the present invention is directed to processes in which at least a substantial portion of such sodium values are recovered in a form which is active in the absorption-desorption system, and this includes at least a significant amount of the metal values which are formed in the absorptiondesorption system as inert sodium thiosulfate.

Thus in one embodiment of the process of the present invention the liquid phase enriched in sodium thiosulfate content by the evaporation of water and precipitation of solids from desorption liquid as described above, can be treated to recover its sodium values in a form suitable for use in the sulfur dioxide absorption-desorption cycle. If desired, other sodium-containing materials may be treated along with the sodium thiosulfate enriched liquid in order to increase the amount of usable sodium recovered. A preferred additional sodium-containing material which may be treated is that which may be removed from the sulfur dioxide absorption-desorption system for the purpose of purging sodium sulfate. Suitable procedures for recovering sodium values include those described in copending patent application, Ser. No. 637, 145, filed Dec. 3, 1975, herein incorporated by reference.

In this aspect of the method of the present invention, liquid medium enriched in sodium thiosulfate content and which is usually substantially devoid of carbonates, can be subjected to chemical reduction to provide an aqueous product whose total sodium content is composed to a major weight extent of carbonates, i.e., sodium carbonate and sodium bicarbonate, and generally to a minor amount of sodium bisulfide. In this product the amount of carbonate is substantial and may often exceed the amount of bicarbonate present. In some systems this product may be acceptably returned to the sulfur dioxide absorption-desorption system, preferably after the removal of a portion of its water, but if the amount of sodium bisulfide is too great further treatment may be desirable. Thus the liquid product from the chemical reduction may be carbonated to increase the ratio of sodium bicarbonate to carbonate present. The increase in sodium bicarbonate content, and preferably a reduction in the amount of water present, facilitate the reaction of bicarbonate with sodium bisulfide to decrease the amount of the latter in the resulting carbonate-containing product in which most of the sodium is in a form which is active for reuse in the absorption-desorption system. The product gases from one or more of the reduction, carbonation and water removal treatments which may contain hydrogen sulfide, carbon oxides, and hydrogen, can be incinerated to produce a sulfur dioxide-containing gas which can be sent to the absorption stage of the process for the removal of sulfur dioxide. During the chemical reduction of the thiosulfate-containing material a small amount of carbon may be formed, and the carbon is preferably separated from the liquid product, for instance, after the carbonation is performed. The carbon can be used as fuel in the chemical reduction stage or in other facilities which are generally present in the plant such as steam-generating boilers or the like. Accordingly, there need be no significant production of by-products requiring special handling or disposal facilities as the result of using the process of the present invention.

In accordance with this embodiment of the invention, chemical reduction is involved in the recovery of active sodium from sodium thiosulfate-containing liquid. In this context active sodium refers to a sodium compound or compounds which, upon charging to the absorption-desorption system, can participate in the recovery of sulfur dioxide from sulfur dioxide-containing gases. The chemical reduction of thiosulfate-containing liquid is of the type which provides a product whose sodium content is to a major weight extent in the form of sodium carbonates, and usually the carbonates have a greater amount of carbonate than bicarbonate. The reduction can be accomplished by subjecting an aqueous material containing sodium thiosulfate, with or without sodium sulfate, to a reducing atmosphere under reducing conditions at elevated temperature, e.g., about 800° to 1050° C., preferabiy about 850° to 950° C. Advantageously, this operation involves the use of a reducing incineration in which the elevated temperature is maintained by burning a fuel in the presence of less than a stoichiometric amount of oxygen to convert the fuel to carbon dioxide and water, say less than about 90 volume percent, preferably about 65 to 80 volume percent, of the amount. The oxygen may be supplied as air or other molecular oxygen-containing gas. Often a major amount, preferably at least about 75 percent, of each of the sodium thiosulfate and sodium sulfate present is converted to other materials such as sodium bisulfide and the sodium carbonates. The major amount of any sodium bisulfite or sulfite present may also be converted to such materials. As previously noted, in the reduction system sulfite and bisulfite react more readily with the reductants, and the increase in the concentration of thiosulfate or sulfate in the material fed to the reduction stage in accordance with this invention improves the economy and efficiency of this operation. If the reduction were employed without the thiosulfate concentration step of this invention, any bisulfide produced during the reduction and returned to the absorption-desorption system leads to the formation of more thiosulfate, and the additional sulfite and bisulfite which would be associated with the thiosulfate when fed to the reduction system for purging would be reduced thereby lowering the reduction efficiency still further.

Suitable fuels for the reduction operation may especially include fluid fuels, i.e., gases or liquids under normal conditions. The fuel may have a heating value of at least about 150 B.T.U.'s per cubic foot. The fuel may be a hydrocarbon material, e.g., having up to about seven carbon atoms such as methane, a hydrocarbon liquid such as fuel oil or a relatively low BTU-fuel which may contain substantial quantities of carbon monoxide, carbon dioxide and hydrogen along with a small amount, if any, of hydrocarbon. A typical fuel of the latter type may be gas from a Winkler coal gasification process such as water gas produced from a Winkler generator and containing, for example, 21% $CO_2$, 38% CO, 39% $H_2$, 1.5% $CH_4$ and 0.5% $N_2$ (volume % on a dry basis) and having a heating value of 263.5 BTU per standard cubic foot.

A preferred manner of conducting the reduction is by use of a submerged combustion incinerator such as a Nittetu incinerator which is described in "Waste Liquid Incineration and Valuable Recovery in Chemical Industry", Chemical Economy and Engineering Review, Vol. 4, No. 12 (No. 56), pp. 45-51, Dec., 1972, see also U.S. Pat. No. 3,887,682 and Canadian Pat. No. 972,924. Under submerged incineration conditions the fuel and oxygen-containing gas undergoing combustion and any other gases are mixed with the aqueous thiosulfate-containing material, with or without another sulfate-containing aqueous stream which has been atomized by steam or other gaseous fluid and introduced into the high temperature combustion zone, and the desired conversion is obtained. The combustion and reduction products are then immediately cooled by being submerged in a liquid aqueous phase maintained in a product quench tank. The quenching medium is generally previously prepared product in aqueous form, and water may be added separately to the quench tank to maintain the desired temperature and water content. For example, the concentration of salts in the quench tank liquid may be about 10 to 25 weight percent, preferably about 15 to 20 weight percent. The temperature of the quench tank liquid may be, for example, about 60 to 115° C., preferably about 80 to 110° C. The choice of temperature may depend on the pressure employed, and the pressure may be ambient, reduced or elevated. Preferably, approximately atmospheric pressure is used. Other incineration systems can, however, be employed but it is desirable for the burner which produces reducing conditions to be separate from the injector for the aqueous thiosulfate-containing and sulfatecontaining material or materials treated.

In the incinerator the fuel-to-air ratio to the burner for combustion is adjusted to give an overall reducing atmosphere in the incinerator when no aqueous salt medium or atomizing steam is charged. Other reducing gases may be charged to the incinerator and the combustion products may contain, for example, approximately 10% by volume of carbon monoxide, 10% by volume of hydrogen and 8% by volume of carbon dioxide. A methane and air mixture containing approximately 70 to 75% of the stoichiometric quantity of air for complete combustion is found to be suitable in a top-fired incinerator. The concentration of salts in the feed solution or slurry charged for treatment may often be in the range of about 25 to 50% by weight, and it is an advantage if the concentrated thiosulfate-containing liquid, and any sulfate liquor from any preliminary concentration operation be used without being either further concentrated or diluted before incineration. This is possible with, for example, liquors containing about 40 to 50 weight percent of total salts.

The average residence time of a salt particle in the incinerator may preferably not be less than about 1.5 seconds. The feed solution or slurry may be atomized with steam or other gaseous fluid in order to provide a fine distribution of particles within the incinerator to intimately admix this feed with the combustion gases. It may not be a disadvantage if some of the salts are sprayed onto the internal walls of the reactor, and subsequently collected in the quench tank or salt recovery drum by downward flow in the molten state.

In some situations the use of chemical reduction as described above may be adequate for purging sodium thiosulfate, and if desired sodium sulfate, from the sulfur dioxide absorption-desorption system and recovering sodium values, especially if the concentration of salts in the liquid product from the quench tank is increased somewhat say by at least about 25 weight percent, by the evaporation of water before charging to the absorption-desorption system, but in many instances it may be desirable to subject the said liquid product to carbonation to convert a substantial amount of the carbonate to bicarbonate and as a result usually obtain a product containing a greater amount of bicarbonate than carbonate. This is particularly the case if the amount of sodium bisulfide formed in the chemical reduction leads to excessive build-up of this material or of sodium thiosulfate which may be produced in the system through the reaction of sodium bisulfide with sodium sulfite. In the carbonation treatment, liquid from the chemical reduction can be carbonated at elevated temperature by contact with a carbon dioxide-containing gas, having, say, a carbon dioxide partial pressure of about 1 to 20 psi. Suitable carbonation temperatures include about 30° to 100° C., preferably about 35° to 75° C. The carbonation is conducted at pressures sufficient to maintain the liquid phase, e.g., about 2 to 45 psig, and usually the concentration of total salts is a minor amount of the material treated, preferably about 10 to 40 weight percent. The extent of carbonation is often sufficient to form a product in which the weight ratio of sodium bicarbonate to sodium carbonate is at least about 1.5, say up to about 3:1 or more. The carbonated liquid is then treated to react the major portion, preferably at least about 75, or even at least about 90, weight percent of the sodium bisulfide with sodium bicarbonate. This can be done at elevated temperatures, say about 60° to 110° C., preferably about 80° to 105° C. The choice of temperature may depend on the pressure employed, and the pressure may be ambient, reduced or elevated. Preferably, approximately atmospheric pressure is used. The liquid is, preferably, subjected to evaporation, usually at the same time, to increase its salt content by a substantial amount, e.g., by at least about 25 weight percent up to about 80 weight percent or more. The material remaining after the evaporation of water may be returned to the sulfur dioxide absorption-desorption system after, for instance, separation of gases and any insolubles present such as carbon. The off-gases from the carbonation and evaporation stages may contain hydrogen sulfide and they may be incinerated or oxidized, along with, for instance, gas from the chemical reducing-quenching operation to form sulfur dioxide which can be recovered by charging to the absorption zone of the sulfur dioxide absorption-desorption cycle.

The foregoing described procedures for recovering the sodium values of sodium thiosulfate enriched liquids obtained by evaporation of water from the sulfur dioxide desorption zone liquid to precipitate solids, may be employed to recover the sodium values of other materials derived from the sulfur dioxide absorption-desorption system. There may especially be charged to the sodium value recovery operation, materials which are removed from the absorption-desorption system to purge inert sodium sulfate. Several methods can be used to concentrate sodium sulfate in the aqueous absorption-descrption medium for more selective purging of sulfate and these procedures may involve one or both of contact with a sulfur dioxide-containing gas and evaporation of water.

The amount of sodium sulfate purged from the sulfur dioxide removal system is generally sufficient to prevent undue build-up of sodium sulfate in the absorption-desorption system. Advantageously, sufficient sulfate is purged to be substantially equal to the amount of sulfate being formed in the absorption-desorption system when taking into account any sulfate that may be removed from the system by other means, for example, along with the purging of thiosulfate. The sodium sulfate-containing aqueous medium which may also be chemically-reduced in accordance with the process of this invention contains a significant amount of sodium sulfate, for instance, at least about 5 weight percent. Advantageously, however, this medium contains at least about 15 weight percent of sodium sulfate, preferably about 20 to 40 weight percent, since as the sodium sulfate content increases a lesser amount of the material need be treated for a given conversion of inactive to active sodium form. Although the various sulfate-containing streams in the absorption-desorption system may be chemically-reduced in accordance with the process of this invention, the sulfate content may preferably be increased prior to chemical reduction in order to improve the efficiency of the reduction through an increase in the sulfate-thiosulfate to sulfite-bisulfite ratio in the feed to the reduction stage.

Most desirably, sulfate concentration is performed by employing solutions having a higher concentration of sodium bisulfite than sulfite, and it is preferred to employ a portion of the spent absorbing medium as the source of sulfate-containing feed to the chemical reduction stage of the process of this invention. Thus it is advantageous to use a source material having a sodium bisulfite to sodium sulfite mole ratio of at least about 2:1, preferably at least about 3:1. Such sulfate-containing aqueous media in the sulfur dioxide absorption-desorption system usually have a minor amount of sodium sulfate based on the total weight of the medium, and often this amount is about 1 to 10 weight percent. These solutions may also contain about 0.1 to 10 weight percent of sodium sulfite, about 15 to 40 weight percent of sodium bisulfite, and a small amount of sodium thiosulfate. The sodium sulfate content of these materials may with advantage be increased by at least about 10 weight percent based on the total sodium salts present, and preferably is at least about doubled before being subjected to chemical reduction. Advantageously, sodium sulfate is the largest or even the major salt component in the material which is chemically reduced for sulfate and thiosulfate purging, e.g., the weight ratio of sodium sulfate to the total of other sodium compounds in the material may be at least about 1.1:1, preferably at least about 2.5:1. The amount of water in this aqueous salt composition which undergoes chemical reduction is generally sufficient to provide a stirable and pumpable mixture or solution. The amount of water in the mixture may be the largest or even the major weight component of the mixture, for example, about 45 to 80 weight percent of the total weight of the mixture, preferably about 50 to 65 weight percent.

The sodium sulfate content of the absorption-desorption medium which may serve as a source of feed for the chemical reduction may be increased by various procedures. For example, a purge stream of spent absorption solution may be subjected to low temperature crystallization, say at a temperature of about 0° to 10° C., to obtain a solid phase which has a higher sodium sulfate content, on a dry basis, than in spent absorption solution. The solid phase can be mixed with water to obtain an aqueous material suitable for chemical reduction in accordance with this invention. The mother liquor from the crystallization may contain a substantial amount of bisulfite and may be returned with advantage to the desorption stage of the sulfur dioxide removal process.

Preferred methods which can be used for concentration of sodium sulfate in the aqueous absorption-desorption medium include procedures involving the evaporation of water to obtain the precipitation of solids. Thus sulfate can be purged from the system by treating at least a portion of the absorption-desorption medium to remove a sufficient amount of water to precipitate a significant, but limited, amount of solids in the medium. The evaporation of water can preferably be conducted in a manner to form up to about 10 weight percent crystals in the absorption-desorption medium, and this amount may be up to about 20 weight percent especially when the evaporation is performed while contacting the medium with added sulfur dioxide-containing gas. The sulfur dioxide-containing gas is preferably unsaturated with respect to water. Most often the amount of solids precipitated in these various procedures is at least about 1 weight percent of the medium, most preferably about 2 to 8 weight percent.

In one embodiment of the invention substantially the entire absorption-desorption medium may be processed for water removal and sulfate precipitation. Preferably, only a portion of this medium is treated, and in such case frequently about 10 to 90 weight percent of the total medium is processed in this manner, more often about 20 to 75 weight percent. Preferably, this amount is sufficient so that a maximum of about 5 weight percent solids need be precipitated to have an adequate purge of sodium sulfate. The liquid medium or mother liquor separated in the sulfate removal procedure is usually passed to the sulfur dioxide desorption stage since the liquid is high in bisulfite content although it may be desirable to charge it to some other part of the absorption-desorption system.

Temperatures suitable for accomplishing the desired evaporation of water in connection with the purging of sulfate are usually elevated and preferably sufficient to precipitate essentially non-hydrated crystals without excessive water removal. Generally such temperatures are at least about 37° to 38° C., and to be more certain of obtaining a non-hydrated product temperatures of at least about 40° C. are recommended. Suitable temperatures include about 40° to 110° C., preferably about 40° to 75° C. The choice of temperature may depend on the pressure employed, and the pressure may be ambient, reduced or elevated. Advantageously, the pressure is about 0.10 to 20 psia, and preferably approximately atmospheric pressure is used.

The slurry obtained in the water removal operation can be subjected to a liquid-solid separation procedure to provide a separate, essentially solid phase which is relatively high in sulfate content and suitable for use as a feed material to the chemical reduction operation of the method of this invention. The separation may be done without substantially reducing the temperature of the slurry, and the temperatue may often be about 40° to 110° C., preferably about 40° to 80° C. The separated liquid phase or mother liquor can be charged to the absorption-desorption system, and preferably to the desorption zone.

Suitable processes for concentrating the sulfate content of materials derived from the above-described sulfur dioxide absorption-desorption systems by limited precipitation of solids through the evaporation of water from such materials are described in U.S. patent applications Ser. No. 630,503, filed Nov. 10, 1975 in the names of Norman E. Nicholson, John Scarlett and John Frederick Flintoff, and Ser. No. 647,516, filed Jan. 8, 1976, in the names of Edgar E. Bailey, Norman E. Nicholson, John Scarlett and John Frederick Flintoff, both applications being herein incorporated by reference. Other suitable procedures for obtaining solids of increased sodium sulfate content which involve the use of sulfur dioxide-containing gases are described in U.S. Patent Applications Ser. No. 443,326, filed Feb. 19, 1974, U.S. Pat. No. 3,971,844 in the name of Raymond T. Schneider; and Ser. No. 637,954, filed Dec. 5, 1975, in the name of William R. Parish, both applications also being incorporated herein by reference.

In the sulfur dioxide desorption stage of the method of this invention the spent absorption medium is subjected to elevated temperatures to convert sodium bisulfite into sodium sulfite with the concomitant formation of a vapor phase containing sulfur dioxide and water. Suitable temperatures for this operation include about 40° to 110° C., preferably about 60° to 95° C. The pressure may be, for example, about 3 to 21 psia, preferably about 8 to 15 psia. The vapor phase can be treated for the recovery of purer sulfur dioxide, the manufacture of sulfur, or used, treated or disposed of in any other suitable manner. Various procedures for sulfur dioxide desorption can be used and a number are known in the art. It is preferred, however, that the desorption be accomplished with the simultaneous formation of an undissolved solids or crystal phase which enables the desorption to be accomplished with the use of lesser amounts of heat. In such operations the amount of undissolved solids in the desorption zone is generally at least about 15 weight percent of the slurry undergoing decomposition or sulfur dioxide desorption. As described in U.S. Pat. No. 3,790,660 the amount of such solids is advantageously at least about 25 weight percent in order to alleviate difficulties of tube fouling, particularly when supplying heat to the desorption zone by passing the slurry through the tubes of an indirect heat exchanger. Preferably, the amount of undissolved solids is about 30 to 50 or 60 weight percent of the slurry undergoing decomposition. Also when the amount of undissolved solids is sufficiently high, the sodium sulfite content of the slurry may be adequate for a portion of the total slurry to be combined with water to dissolve the solids, and the resulting solution can be used as the lean solution for absorbing sulfur dioxide from the gas being treated in the absorption zone of the absorption-desorption system. The lean absorbing solution is usually composed to a major weight extent of sodium sulfite and minor weight amounts of sodium bisulfite and sodium sulfate based on the total amount of these salts present. Often the lean absorbing solution has about 10 to 35 weight percent sodium sulfite, about 3 to 15 weight percent sodium bisulfite, and about 1 to 10 weight percent sodium sulfate based on these components and water present.

The accompanying flow sheet represents diagrammatically and by way of example, one form of sulfur dioxide removal or recovery system in accordance with the present invention.

Figure 1:
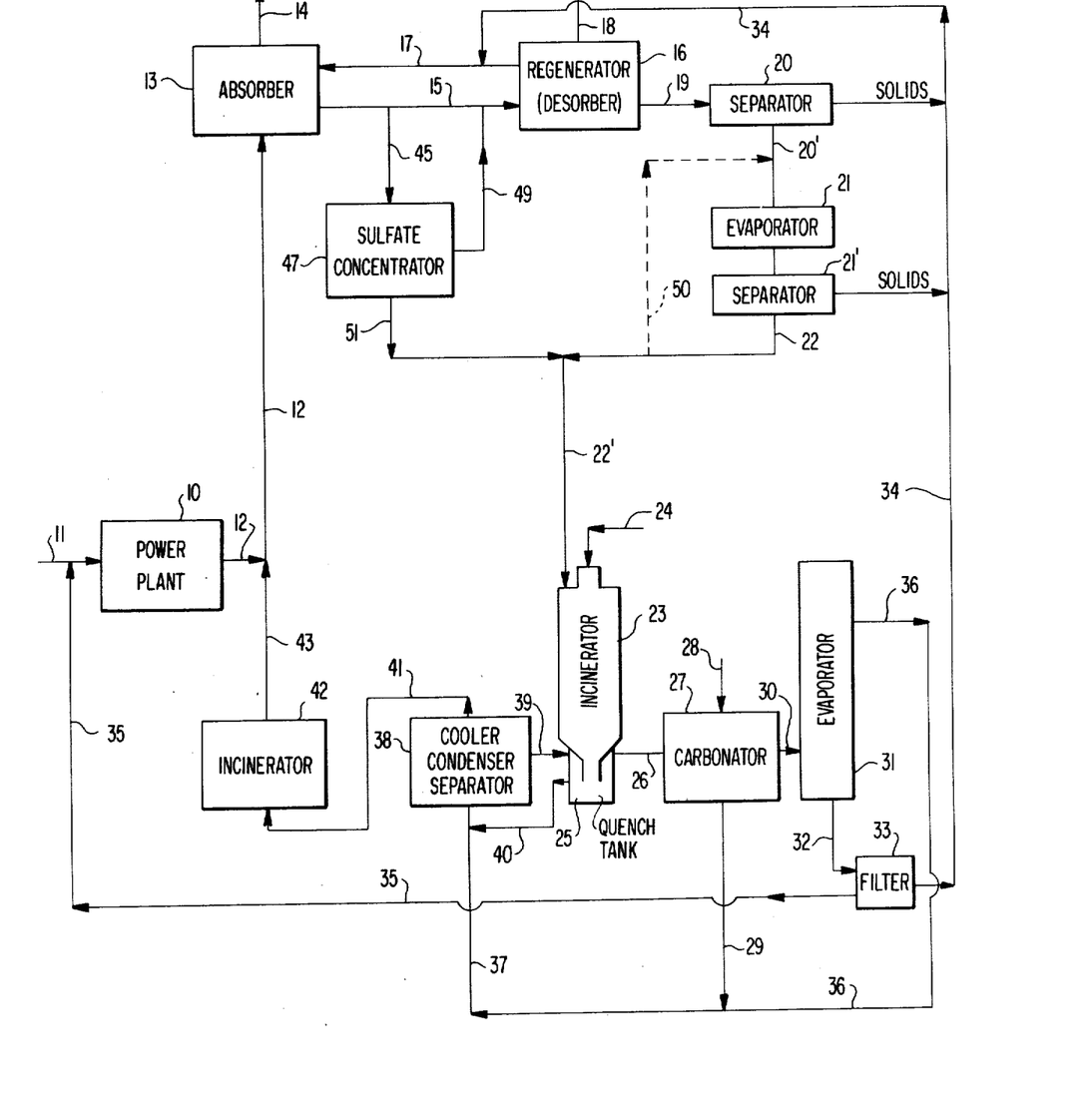

A main power plant is represented at 10 and is supplied by fuel through line 11. The plant produces a sulfur dioxide-containing flue gas in line 12 which is passed to an absorption vessel 13 from which desulfurized off-gas is discharged by line 14. Spent absorption liquid containing sodium bisulfite, sodium sulfite and sodium sulfate passes from vessel 13 by line 15 to the regeneration or desorption vessel 16 from which regenerated absorption liquor returns by line 17 to absorption vessel 13. Sulfur dioxide is removed from the desorption vessel 16 by line 18.

A purge stream of desorption zone slurry is taken from desorption vessel 16 by line 19 to separator 20 for separation of solids from the liquid. The solids are removed and can be dissolved in the liquid in line 34 and returned to the absorption vessel 13 via line 17. The liquid from separator 20 is passed by line 20' to evaporator 21 where water is removed overhead and solids are precipitated. The resulting slurry is passed to liquid-solid separator 21' and separated solids are sent to line 34 wherein the solids are also dissolved in the liquid and returned to absorption vessel 13 by way of line 17. Liquid enriched in sodium thiosulfate is taken from separator 21' and is passed by lines 22 and 22' to a reducing incinerator represented at 23 which is preferably gas-fired from line 24, for example, by a mixture of methane and air passing to a burner separate from the injector for concentrated thiosulfate. The concentration of sodium thiosulfate in the liquid in line 22 may be increased by recycling a portion of the liquid from line 22 through line 50 to line 20' for return to evaporator 21. If desired, a purge stream of spent absorption liquor can be taken from line 15 by line 45 to a water evaporation, crystallization, or other sulfate concentration stage represented at 47, and the mother liquor obtained is returned by line 49 to the regenerator or desorption vessel 16 by passage into line 15 at a point downstream of line 45. A sulfate concentrate can be removed from stage 47 by line 51 and passed to line 22' where it combines with the thiosulfate enriched liquor from line 22 for passage to reducing incinerator 23.

The mixed products of combustion and chemical reduction pass into quench tank or salt recovery drum 25 of the incinerator 23 to form a carbonate-rich green liquor which then travels by line 26 to a carbonation stage represented at 27 and to which carbon dioxide is supplied by line 28. Carbon dioxide and hydrogen sulfide are removed from carbonator 27 by line 29.

The treated liquor from the carbonation proceeds by line 30 to an evaporator 31 and thence by line 32 to filter 33 for removal of carbon, from which the carbonated alkali salt solution passes by line 34 to line 17 containing regenerated absorption liquor. Carbon from filter 33 may be removed by line 35 and charged to the fuel supply line 11, while effluent gas from the evaporator 31 containing carbon dioxide, hydrogen sulfide and steam is removed by line 36 to which is added the gases from line 29. The combined gases pass by line 37 to a cooling, condensing and separation stage represented at 38 from which the resulting aqueous stream is passed by line 39 to the quench tank 25. In line 40 an effluent gas from the chemical reduction containing hydrogen sulfide, carbon oxides and nitrogen is passed between the drum 25 and line 37 for treatment of the latter gases also in stage 38. Carbon oxides, i.e., carbon monoxide and carbon dioxide, nitrogen and hydrogen sulfide from stage 38 are passed through line 41 to an oxidizing incinerator represented at 42 to which air or other oxygen-containing gas is charged to convert hydrogen sulfide to sulfur dioxide, and one or both of carbon monoxide to carbon dioxide and hydrogen to steam at elevated oxidizing temperatures. Outlet gases pass from stage 42 by line 43 to join gases in line 12 for sulfur dioxide removal.

A variation of the above system may be made by the recycling of carbon residues in line 35 from the filter 33, back to incinerator 23 as part of the fuel requirement, rather than to the main fuel line 11. Proper conditions must then however still be maintained in the incinerator 23 to secure conversion of the primary alkali metal feedstock to a carbonated salt.

The present invention will be further illustrated by the following example. The liquid separated from the desorption vessel 16 of the drawing when operated in accordance with the process of U.S. Pat. No. 3,790,660 may typically be constituted approximately as follows:

| Component | Weight % |
|---|---|
| $Na_2SO_3$ | 5.1 |
| $NaHSO_3$ (calc. as $Na_2S_2O_5$) | 30.6 |
| $Na_2SO_4$ | 5.0 |
| $Na_2S_2O_3$ | 1.5 |
| $H_2O$ | 57.8 |

Evaporation of water from this solution to provide for example, a slurry containing 45 weight percent undissolved solids, i.e., the amount of solids precipitated is about 30 weight percent of the liquid phase treated, gives a mother liquor of the approximate composition:

| Component | Weight % |
|---|---|
| $Na_2SO_3$ | 4.1 |
| $NaHSO_3$ (calc. as | |

| Component | Weight % |
|---|---|
| Na₂S₂O₅) | 40.5 |
| Na₂SO₄ | 3.0 |
| Na₂S₂O₃ | 5.5 |
| H₂O | 46.9 |

The resulting solids when containing, for example, 25 weight percent of adhering mother liquor may have the approximate composition:

| Component | Weight % |
|---|---|
| Na₂SO₃ | 51.8 |
| NaHSO₃ (calc. as | |
| Na₂S₂O₅) | 20.1 |
| Na₂SO₄ | 15.0 |
| Na₂S₂O₃ | 1.4 |
| H₂O | 11.7 |

If the control of sodium thiosulfate is to be by discard of the thiosulfate-containing solution, the loss in active sodium values is reduced by more than one-half by discarding the above mother liquor having an approximately 10% sodium thiosulfate concentration on a dry basis, rather than discarding the desorption zone liquor having only a 3.5% sodium thiosulfate concentration on a dry basis.

A composite is made of a sodium sulfate concentrate of the type in line 51 of the drawing and a sodium thiosulfate control purge stream of the type in line 22 of the drawing. The components of each of these streams and the combined stream are approximately as follows:

| Component | Sulfate Concentrate, Wt. % | Composite Wt. % | (Approx. Range) | Enriched Thiosulfate Purge, Wt. % |
|---|---|---|---|---|
| Na₂SO₃ | 4.4 | 4.3 | (2.6 to 6) | 4.1 |
| NaHSO₃ (calc. as | | | | |
| Na₂S₂O₅) | 0.13 | 8.2 | (2 to 13) | 40.5 |
| Na₂SO₄ | 36.2 | 29.6 | (23 to 35) | 3.0 |
| Na₂S₂O₃ | .01 | 1.1 | (0.6 to 4) | 5.5 |
| H₂O (difference) | 59.26 | 56.8 | (53 to 60) | 46.9 |

The resulting mixture is a slurry which can be atomized by steam injection into a top-fired, vertical, submerged combustion incinerator in which methane is burned at about 900° C. with about 72% of the theoretical amount of air required for complete combustion to thereby maintain a reducing atmosphere. Alternatively the composite can be diluted with water to obtain an essentially complete solution of about 25 to 35 weight percent salts, and the solution chemically reduced under conditions similar to those employed in treating the slurry feed. The gaseous combustion products and liquid-containing reaction mixture is quenched in a collection tank containing previously obtained products. The quench tank liquid is typically comprised approximately of the following:

| Component | Weight % | (Approx. Range) |
|---|---|---|
| Na₂SO₃ | 0.2 | (0.1 to 1.0) |
| NaHSO₃ (calc. as | | |
| Na₂S₂O₅) | Nil | Nil |
| Na₂SO₄ | 3.3 | (2.0 to 6.0) |
| Na₂S₂O₃ | 0.1 | (0.02 to 0.20) |
| Na₂CO₃ | 8.3 | (4.5 to 13.0) |
| NaHCO₃ | 4.5 | (1.0 to 7.0) |
| NaHS | 1.6 | (0.5 to 4.0) |
| H₂O (by difference) | 82.0 | (75.0 to 85.0) |

The quench tank liquid is then evaporated at 105° C. to remove water and obtain a liquid of the following approximate composition:

| Component | Weight % | (Approx. Range) |
|---|---|---|
| Na₂SO₃ | 0.4 | (0.2 to 2.0) |
| NaHSO₃ (Calc. as | | |
| Na₂S₂O₅) | Nil | Nil |
| Na₂SO₄ | 6.6 | (4.0 to 12.0) |
| Na₂S₂O₃ | 0.2 | (0.04 to 0.4) |
| Na₂CO₃ | 21.1 | (14.0 to 29.0) |
| NaHCO₃ | 3.6 | (1.0 to 5.0) |
| NaHS | 1.1 | (0.5 to 3.0) |
| H₂O (by difference) | 67.0 | (60.0 to 70.0) |

The evaporation of water at elevated temperature serves to react a portion of the sodium bicarbonate with sodium bisulfide to form sodium carbonate. The amount of the sodium carbonate is also increased by decomposition of sodium bicarbonate. The removal of sodium bisulfide is also beneficial since when the liquid is used in the sulfur dioxide absorption-desorption cycle the bisulfide is a precursor of sodium thiosulfate through reaction with sodium sulfite.

If the amount of bisulfide remaining in the liquid is such that there would be an undesirable build-up of thiosulfate in the sulfur dioxide absorption-desorption cycle when the liquid from the evaporation is recycled, the quench tank liquor can be carbonated by contact with carbon dioxide at about 40° C. and water evaporated from the carbonated liquid to reduce the amount of sodium bisulfide present. The composition of the liquor obtained from the carbonation may typically be approximately as follows:

| Component | Weight % | (Approx. Range) |
|---|---|---|
| Na₂SO₃ | 0.2 | (0.1 to 1.0) |
| NaHSO₃ (Calc. as | | |
| Na₂S₂O₅) | Nil | Nil |
| Na₂SO₄ | 3.3 | (2.0 to 6.0) |
| Na₂S₂O₃ | 0.1 | (0.02 to 0.20) |
| Na₂CO₃ | 5.0 | (2.0 to 10.0) |
| NaHCO₃ | 9.2 | (5.0 to 16.0) |
| NaHS | 1.6 | (0.5 to 4.0) |
| H₂O (by difference) | 80.5 | (75.0 to 85.0) |

Thus carbonation serves to convert sodium carbonate to bicarbonate which in turn may react with sodium bisulfide, especially at slightly elevated temperatures such as those used to evaporate water from the mixture. Evaporation of water from this liquor at 50° C. to the point where the salt content is increased by about 14% gives about 94% reduction in the amount of sodium bisulfide present and typically a liquor of the following approximate composition:

| Component | Weight % | (Approx. Range) |
|---|---|---|
| $Na_2SO_3$ | 0.3 | (0.2 to 2.5) |
| $NaHSO_3$ (calc. as $Na_2S_2O_5$) | Nil | Nil |
| $Na_2SO_4$ | 6.7 | (4.5 to 14.0) |
| $Na_2S_2O_3$ | 0.1 | (0.04 to 0.5) |
| $Na_2CO_3$ | 19.8 | (15.0 to 25.0) |
| $NaHCO_3$ | 6.4 | (3.0 to 10.0) |
| NaHS | 0.1 | (0.01 to 0.2) |
| $H_2O$ (by difference) | 66.6 | (60.0 to 70.0) |

This liquor can be charged to the lean absorption solution stream passing to the absorption zone of an absorption-desorption system for removing sulfur dioxide from gases. Thus according to the method of this invention there need be no significant loss of sodium values from the system due to the formation of sodium sulfate and sodium thiosulfate.

The use of sodium thiosulfate enrichment by the evaporation of water from the desorption zone liquid and the precipitation and removal of solids in accordance with this invention result in less total material to be subjected to the chemical reduction system for recovery of active sodium values and thereby provide savings in capital and operating costs. Also, if the desorption zone liquor were combined as such with a sulfate purge stream, the composite would have a lowered sulfate-thiosulfate to sulfite-bisulfite ratio, compared with a similar composite made with a thiosulfate-enriched liquid of this invention. As a result, the combination of a sulfate purge stream with desorption zone liquor as such would have an adverse effect on the level of conversion of the sulfate-thiosulfate component and the recovery of active sodium values from the chemical reduction operation with attendant increases in capital and operating costs. For example, by using the process of this invention the amount of feed to the chemical reduction system may be decreased by about 35 weight percent due to the lesser mass of the thiosulfate purge stream treated and the improvement in sulfate-thiosulfate conversion, e.g., from about 65 to about 75%.

It is claimed:

1. In a process for the removal of sulfur dioxide from gas in which sulfur dioxide is absorbed from the gas in an aqueous absorption solution of sodium sulfite to form the corresponding bisulfite, resulting bisulfite-containing absorption solution is desorbed to form sulfur dioxide and precipitate at least about 25 weight percent of sodium sulfite-containing solids in a desorption zone containing the resulting slurry, and a sulfite-containing absorption solution is regenerated for recycling, and in which sodium thiosulfate is in the absorption-desorption system, the improvement for removing thiosulfate from the system comprising withdrawing a portion of the desorption zone slurry from the desorption zone, separating sodium sulfite-containing solids from liquid of said slurry, said separated desorption zone liquid having in solution a major amount of sodium bisulfite, and minor amounts of sodium thiosulfate and sodium sulfite, based on the total weight of these salts, evaporating water from said withdrawn aqueous desorption zone liquid to precipitate at least about 15% solids from said liquid to at least about double the sodium thiosulfate content of the liquid phase on a total salt basis, separating precipitated solids from sodium thiosulfate-containing solution, and passing separated solids to the absorption-desorption system.

2. The process of claim 1 in which the temperature of said evaporation is about 40° to 90° C.

3. The process of claim 1 in which about 15 to 40 weight percent of said liquid phase is precipitated as solids by said evaporation of water and the liquid phase remaining after said evaporation contains about 5 to 20 weight percent of sodium thiosulfate on a total dissolved salt basis.

4. A process of claim 3 in which the desorption is conducted with a slurry containing about 30 to 60 weight percent of total undissolved solids.

5. In a process for the removal of sulfur dioxide from gas in which sulfur dioxide is absorbed from the gas in an aqueous absorption solution of sodium sulfite to form the corresponding bisulfite, resulting bisulfite-containing absorption solution is desorbed to form sulfur dioxide and precipitate at least about 25 weight percent of sodium sulfite-containing solids in a desorption zone containing the resulting slurry, a sulfite-containing absorption solution is regenerated for recycling, and in which sodium thiosulfate is in the absorption-desorption system, the improvement for reducing the amount of sodium thiosulfate in the system which comprises withdrawing a portion of the desorption zone slurry from the desorption zone, separating sodium sulfite-containing solids from liquid of said slurry, said desorption zone liquid having in solution a major amount of sodium bisulfite, and minor amounts of sodium thiosulfate and sodium sulfite, based on the total weight of these salts, evaporating water from said withdrawn aqueous desorption zone liquid to precipiate at least about 15% solids from said liquid to at least about double the sodium thiosulfate content of the liquid phase on a total salt basis, separating precipitated solids from sodium thiosulfate-containing solution, passing separated solids to the absorption-desorption system, chemically-reducing at an elevated temperature said separated solution containing sodium thiosulfate to obtain an aqueous liquid product which contains a major amount of its total sodium content as carbonate and bicarbonate.

6. The process of claim 5 in which sodium carbonate and bicarbonate in said aqueous liquid product are charged to said sulfur dioxide absorption-desorption zone.

7. The process of claim 6 in which water is evaporated from said aqueous liquid product and the resulting liquid product is charged to said sulfur dioxide absorption-desorption system.

8. In a process for the removal of sulfur dioxide from gas in which sulfur dioxide is absorbed from the gas in an aqueous absorption solution of sodium sulfite to form the corresponding bisulfite, resulting bisulfite-containing absorption solution is desorbed to form sulfur dioxide, and precipitate at least about 25 weight percent of sodium sulfite-containing solids in a desorption zone containing the resulting slurry, a sulfite-containing absorption solution is regenerated for recycling, and in which sodium thiosulfate is in the absorption-desorption system, the improvement for reducing the amount of sodium thiosulfate in the system which comprises withdrawing a portion of the desorption zone slurry from the desorption zone, separating sodium sulfite-containing solids from liquid of said slurry, said separated desorption zone liquid having in solution a major amount of sodium bisulfite, and minor amounts of sodium thiosulfate and sodium sulfite, based on the total weight of these salts, evaporating water from said withdrawn aqueous desorption zone liquid to precipitate at least about 15 weight percent of the withdrawn liquid as solids to at least about double the sodium thiosulfate content of the liquid phase on a total salt basis, separating the precipitated solids from sodium thiosulfate-containing solution, passing separated solids to the absorption-desorption system, chemically-reducing at an elevated temperature said separated solution containing sodium thiosulfate by burning a fuel with less than the stoichiometric amount of oxygen for complete combustion of said fuel, while in contact with said sodium thiosulfate-containing solution, and quenching the resulting mixture to obtain an aqueous liquid product which contains a major amount of its total sodium content as carbonate and bicarbonate.

9. A process of claim 8 in which said chemical reduction is conducted at a temperature of about 800° to 1050° C.

10. A process of claim 9 in which said temperature is attained by burning a fluid fuel.

11. A process of claim 10 in which aqueous liquid containing sodium sulfate is separated from the spent absorption solution of said sulfur dioxide absorption-desorption system and also charged to said chemical reduction.

12. A process of claim 10 in which the desorption is conducted with a slurry containing about 30 to 60 weight percent of total undissolved solids, said evaporation of water is conducted at about 40° to 120° C., and the liquid separated from the product obtained by the evaporation of water from the desorption zone liquid contains about 5 to 20 weight percent sodium thiosulfate on a total dissolved salt basis.

13. A process of claim 12 in which aqueous liquid containing sodium sulfate is separated from the spent absorption solution of said sulfur dioxide absorption-desorption system and also charged to said chemical reduction.

14. In a process for the removal of sulfur dioxide from gas in which sulfur dioxide is absorbed from the gas in an aqueous absorption solution of sodium sulfite to form the corresponding bisulfite, resulting bisulfite-containing absorption solution is desorbed to form sulfur dioxide, and precipitate at least about 25 weight percent of sodium sulfite-containing solids in a desorption zone containing the resulting slurry, a sulfite-containing absorption solution is regenerated for recycling, and in which sodium thiosulfate is in the absorption-desorption system, the improvement for reducing the amount of sodium thiosulfate in the system which comprises withdrawing a portion of the desorption zone slurry from the desorption zone, separating sodium sulfite-containing solids from liquid of said slurry, said aqueous desorption zone liquid having in solution a major amount of sodium bisulfite, and minor amounts of sodium thiosulfate and sodium sulfite, based on the total weight of these salts, evaporating water from said withdrawn aqueous desorption zone liquid to precipitate at least about 15% undissolved solids from said liquid to at least about double the sodium thiosulfate content of the liquid phase on a total salt basis, separating precipitated solids from sodium thiosulfate-containing solution, passing separated solids to the absorption-desorption system, chemically-reducing at an elevated temperature said separated solution containing sodium thiosulfate to obtain an aqueous liquid product which contains a major amount of its total sodium content as carbonate and bicarbonate, and a minor amount of sodium bisulfide, carbonating said aqueous liquid product to increase the amount of sodium bicarbonate therein, decreasing the amount of sodium bisulfide in said carbonated liquid product, and passing resulting liquid product to said sulfur dioxide absorption-desorption system.

15. The process of claim 14 in which said chemical-reducing comprises burning a fuel with less than the stoichiometric amount of oxygen for complete combustion of said fuel, while in contact with said sodium thiosulfate-containing solution, and resulting aqueous product is quenched.

16. The process of claim 15 in which said decrease in the amount of sodium bisulfide is accomplished during evaporation of water from the aqueous liquid product from said quenching.

17. The process of claim 16 in which the amount of water evaporated from the aqueous liquid product from said quenching is sufficient to increase the total salt content of the material undergoing treatment by at least about 25 weight percent.

18. The process of claim 17 in which aqueous material subjected to carbonation contains about 10 to 40 weight percent of total sodium salts.

19. A process of claim 18 in which said chemical reduction is conducted at a temperature of about 800° to 1050° C.

20. A process of claim 18 in which said quenching comprises passing products of said combustion into a quench liquid of material previously prepared by said chemical reduction.

21. The process of claim 20 in which said quenched aqueous liquid product contains a major weight amount of its total sodium content as carbonate and bicarbonate and a minor weight amount as bisulfide, and a greater weight amount of sodium carbonate than sodium bicarbonate, said quenched aqueous liquid product is carbonated to increase the weight ratio of sodium bicarbonate to sodium carbonate to at least about 1.5:1, the amount of sodium bisulfide in the carbonated liquid is decreased by a major weight extent, and resulting aqueous liquid is passed to said sulfur dioxide absorption-desorption system.

22. A process of claim 21 in which gas produced during said evaporation of water from said aqueous liquid product from said quenching is oxidized to form sulfur dioxide from hydrogen sulfide therein, and resulting sulfur dioxide containing gas is passed to the absorption zone of said sulfur dioxide absorption-desorption system.

23. A process of claim 22 in which gas from said carbonation is also charged to said oxidation in which sulfur dioxide is formed.

24. A process of claim 23 in which gas from said quenching is also charged to said oxidation in which sulfur dioxide is formed.

25. A process of claim 14 in which aqueous liquid containing sodium sulfate is separated from the spent absorption solution of said sulfur dioxide absorption-desorption system and also charged to said chemical reduction.

26. The process of claim 25 in which said chemical-reducing comprises burning a fluid fuel with less than the stoichiometric amount of oxygen for complete combustion of said fuel, while in contact with said sodium thiosulfate-containing solution, and resulting aqueous product is quenched.

27. The process of claim 26 in which said decrease in the amount of sodium bisulfide is accomplished during evaporation of water from said aqueous liquid product from said quenching.

28. The process of claim 27 in which the amount of water evaporated from said aqueous liquid product from said quenching is sufficient to increase the total salt content of the material undergoing treatment by at least about 25 weight percent.

29. The process of claim 28 in which said quenched aqueous liquid product contains a major weight amount of its total sodium content as carbonate and bicarbonate and a minor weight amount as bisulfide, and a greater weight amount of sodium carbonate than sodium bicarbonate, said quenched aqueous liquid product is carbonated to increase the weight ratio of sodium bicarbonate to sodium carbonate to at least about 1.5:1, the amount of sodium bisulfide in the carbonated liquid is decreased by a major weight extent, and the resulting aqueous liquid is passed to said sulfur dioxide absorption-desorption system.

* * * * *